United States Patent
Weber et al.

(10) Patent No.: US 12,244,212 B2
(45) Date of Patent: Mar. 4, 2025

(54) COOLANT SUPPLY SYSTEM FOR AN ELECTRICALLY OPERATED VEHICLE AXLE

(71) Applicant: AUDI AG, Ingolstadt (DE)

(72) Inventors: Andreas Weber, Ingolstadt (DE); Ivo Greiter, Eitensheim (DE); Harald Gloede, Pförring (DE); Herbert Tschentscher, Riedenburg (DE); Frank Röthlingshöfer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/703,793

(22) PCT Filed: Oct. 13, 2022

(86) PCT No.: PCT/EP2022/078503
§ 371 (c)(1),
(2) Date: Apr. 23, 2024

(87) PCT Pub. No.: WO2023/072606
PCT Pub. Date: May 4, 2023

(65) Prior Publication Data
US 2024/0333103 A1    Oct. 3, 2024

(30) Foreign Application Priority Data
Oct. 28, 2021 (DE) .......................... 102021128068.0

(51) Int. Cl.
*H02K 9/193*    (2006.01)
*H02K 7/00*    (2006.01)
*H02K 9/197*    (2006.01)

(52) U.S. Cl.
CPC ............. *H02K 9/193* (2013.01); *H02K 7/006* (2013.01); *H02K 9/197* (2013.01); *H02K 2209/00* (2013.01)

(58) Field of Classification Search
CPC ........ H02K 9/193; H02K 9/197; H02K 7/116; H02K 7/006
(Continued)

(56) References Cited

U.S. PATENT DOCUMENTS 10,569,202 B1    2/2020  Yasnogorodskiy et al.
2019/0285168 A1  9/2019  Ikeda et al.
(Continued)

FOREIGN PATENT DOCUMENTS

CN    112867881 A    5/2021
DE    2139740 A1     3/1973
(Continued)

OTHER PUBLICATIONS

English Translation of the International Preliminary Report on Patentability issued on Apr. 28, 2024, in corresponding International Application No. PCT/EP2022/078503, 11 pages.
(Continued)

*Primary Examiner* — Jose A Gonzalez Quinones
(74) *Attorney, Agent, or Firm* — Maier & Maier, PLLC

(57) ABSTRACT

A coolant supply system for a drive device of an electrically operated vehicle axle of a two-track vehicle with an electric machine. The coolant supply system has an electric machine hydraulic circuit in which a coolant tank, the interior of a cylindrical stator housing and a stator housing sump are integrated, in which the coolant draining from the stator housing collects, which can be returned from there to the coolant tank by at least one return pump. The stator housing sump has a suction point on each of its axially opposite axial sides, from which the coolant can be sucked off by the return pump.

15 Claims, 4 Drawing Sheets

(58) Field of Classification Search
USPC .............................................. 310/52, 54, 58
See application file for complete search history.

(56) References Cited

U.S. PATENT DOCUMENTS

2019/0305643 A1    10/2019  Huber et al.
2020/0240512 A1*   7/2020   Yashiro .................... F01M 5/00

FOREIGN PATENT DOCUMENTS

| DE | 102008040691 A1   | 2/2010  |             |
|----|-------------------|---------|-------------|
| DE | 102017201117 A1 * | 7/2018  | .............. H02K 9/00 |
| DE | 102019114611 A1   | 4/2020  |             |
| DE | 102019114476 A1   | 12/2020 |             |
| JP | S49148330 U       | 12/1974 |             |
| JP | 2018057243 A *    | 4/2018  |             |
| WO | WO-2023006216 A1 *| 2/2023  | .............. B60K 1/00 |

OTHER PUBLICATIONS

Office Action issued on Jul. 21, 2022, in corresponding German Application No. 102021128068.0, 12 pages.
International Search Report and Written Opinion issued on Feb. 21, 2023, in corresponding International Application No. PCT/EP2022/078503, 16 pages.

* cited by examiner

COOLANT SUPPLY SYSTEM FOR AN ELECTRICALLY OPERATED VEHICLE AXLE

FIELD

The invention relates to a coolant supply system for a drive device of an electrically operated vehicle axle of a two-track vehicle.

BACKGROUND

In the case of an electrically operated, two-track vehicle, an electrically driven vehicle axle can, for example, have an electric machine. This can be arranged axially parallel to the flange shafts guided to the vehicle wheels. In this case, the electric machine can drive via a single or double spur gear stage an axle differential and further the flange shafts of the vehicle axle that are guided to the vehicle wheels.

Such an electric machine can be implemented as a wet-running electric machine in which the stator, in particular the winding heads of the stator windings, are actively cooled. For such active stator cooling, a generic coolant supply system is provided, which has an electric machine hydraulic circuit in which a coolant tank, the interior of a cylindrical stator housing of the electric machine and a stator housing sump extending in the axial direction along the stator housing are integrated. The coolant running out of the stator housing can collect in the stator housing sump and from there be returned to the coolant tank with the help of at least one electric machine return pump.

In the prior art, the stator housing sump extends centrally below the stator housing in the axial direction. Viewed in the axial direction, the stator housing sump also has an approximately central suction point, at which the collected coolant is sucked off by the electric machine return pump in the direction of the coolant tank. Depending on the driving condition, for example when accelerating, curving, driving uphill or downhill, the coolant collected in the stator housing sump can shift away from the sump suction point due to centrifugal force. In this case, a reliable return of the coolant from the stator housing sump towards the coolant tank is impaired.

From DE 10 2019 114 476 A1 an oil pan with a two-part collecting space is known. An oil pan for an engine is known from DE 2 139 740 A. A transmission oil chamber is known from DE 10 2008 040 691 A1.

SUMMARY

The object of the invention is to provide a coolant supply system for a drive device of an electrically operated vehicle axle of a two-track vehicle, in which the coolant can be reliably circulated in different driving operating states.

The invention is based on a coolant supply system for a drive device of an electrically operated vehicle axle of a two-track vehicle. The drive device has a wet-running electric machine. The coolant supply system consists of an electric machine hydraulic circuit. A coolant tank, the interior of a cylindrical stator housing of the electric machine and a stator housing sump extending in the axial direction along the cylindrical stator housing are integrated therein. The coolant draining from the stator housing collects in the stator housing sump. From there, the coolant is returned to the coolant tank by means of at least one electric machine return pump. According to the characterizing part of claim 1, the stator housing sump has a suction point on each of its axially opposite axial sides, at which the collected coolant can be sucked off by the return pump. With the help of the two suction points, compared to the prior art, reliable suction of the coolant towards the coolant tank can be ensured in a variety of driving operating conditions, whereby the coolant can be reliably circulated in the electric machine hydraulic circuit.

In a technical implementation, the electric machine can be installed transversely, parallel to the vehicle axle. In this case, one suction point of the stator housing sump is positioned on the right side of the vehicle, while the other suction point of the stator housing sump is positioned on the left side of the vehicle. When the vehicle curves to the left, the coolant in the stator housing sump is displaced towards the right suction point due to centrifugal force. When the vehicle curves to the right, the coolant in the stator housing sump is displaced towards the left suction point due to centrifugal force. Especially when curving, the coolant can therefore be safely returned to the coolant tank from at least one of the two suction points of the stator housing sump.

In a first embodiment variant, both the right suction point and the left suction point are arranged directly in the stator housing sump. Each of the two suction points can be associated with its own electric machine return pump.

In this case, the electric machine can drive via a single or double spur gear stage an axle differential and further the flange shafts of the vehicle axle that are guided to the vehicle wheels. In this case, it is preferred if the coolant supply system additionally has a transmission hydraulic circuit that is largely separate from the electric machine hydraulic circuit. The coolant tank, the transmission interior and a transmission sump formed on the transmission bottom can be integrated into the transmission hydraulic circuit. In the transmission sump, the coolant draining from transmission components is collected at a transmission suction point and from there returned to the coolant tank with the help of a transmission return pump. The transmission can be flanged directly to one of the stator housing axial sides of the electric machine, so that the stator housing is axially extended with the transmission housing.

With the above transmission arrangement, the following embodiment variant can be implemented: a fluidic connection can be provided to the stator housing axial side close to the transmission, which fluidly connects the stator housing sump to the transmission sump. The coolant that collects on the side of the stator housing sump close to the transmission, for example as a result of cornering, is directed via the flow connection into the transmission sump. In this case, the transmission-side suction point can have a dual function, not only returning the coolant that collects in the transmission sump to the coolant tank, but also the coolant that is transferred from the stator housing sump. Therefore, there is no need for a separate stator housing suction point on the side of the stator housing sump close to the transmission.

In a space-saving embodiment variant, the at least one electric machine return pump can be arranged on a common stator housing axial side, in particular together with the transmission return pump and/or the transmission. The stator housing sump can extend in the axial direction to the respective stator housing axial side. The stator housing can be realized as a cast part, on which the stator housing sump is formed in one piece and using the same material. The suction point arranged on the stator housing axial side remote from the pump can be connected to the electric machine return pump via an additional return line. In a space-saving design variant, the return line can extend axially parallel to the stator housing sump. In addition, the return line can be formed together with the stator housing sump using the same material and in one piece on the stator housing.

BRIEF DESCRIPTION OF THE FIGURES

Exemplary embodiments of the invention are described in the following on the basis of the appended figures. In the figures.

DETAILED DESCRIPTION

Figure 1:
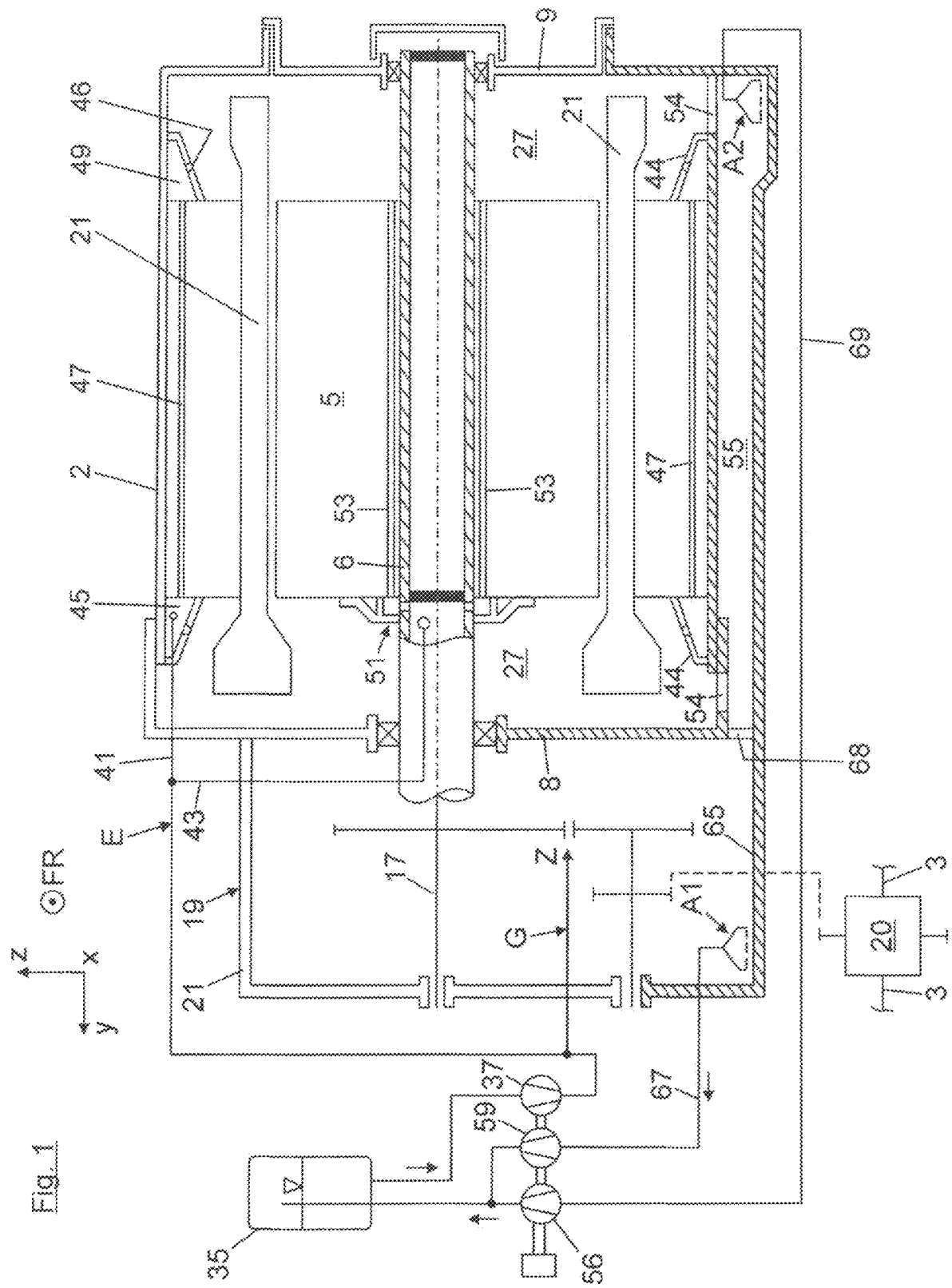
FIG. 1 shows a roughly schematic sectional view of the electric machine with an associated coolant supply system.

FIG. 1 shows a drive device for a vehicle axle of a two-track vehicle. The drive device has an electric machine which, when installed transversely, is arranged axially parallel to the flange shafts 3 guided to the vehicle wheels. A stator 4 with a rotor 5 interacting therewith is arranged in a stator housing 2 of the electric machine. The rotor shaft 6 is rotatably mounted in bearing openings on axially opposite housing walls 8, 9 of the stator housing 2. The rotor shaft 6 of the electric machine is connected in a rotationally fixed manner to a transmission input shaft 17 of a transmission 19, for example via a spline. In FIG. 1, the transmission 19 is realized as a two-stage spur gear that drives an axle differential 20. In FIG. 1, the axle differential 20 is positioned outside a transmission housing 21 for reasons of clarity. In fact, the axle differential 20 can be positioned within the gear housing 21 together with the two-stage spur gear.

In FIG. 1, the stator 4 has a plurality of stator windings, of which only two stator windings 21 are roughly indicated in FIG. 1. Each stator winding 21 has a winding head on both axial sides, which projects into a winding head space 27. Each winding head space 27 is integrated into an electric machine hydraulic circuit E described later, with the help of which the respective winding head space 27 can be supplied with coolant in order to cool the winding heads of the stator 4. In each of the winding head spaces 27, a coolant/air mixture moves in a vortex flow around the rotor shaft 5, which rotates at high speed.

As shown in FIG. 1, the electric machine hydraulic circuit E has a coolant tank 35, which is connected to a suction pump 37 via a suction line. A pressure line leads from the suction pump 37 to coolant supply lines 41, 43. By means of the supply line 41, coolant is fed into a radially outer circumferential annular gap 45. From there, the coolant is guided via radially outer stator channels 47 to a further annular gap 49 in the right winding head space 27. The two annular gaps 45, 47 are separated from the respective winding head space 27 via splash rings 44. Each of the splash rings 44 has nozzles 46 distributed in the circumferential direction, via which coolant (i.e. oil) can be injected into the respective winding head space 27.

By means of the supply line 43, coolant is guided through the rotor shaft 6 and passed via a flow connection 51 into radially inner stator channels 53 into the right winding head space 27. In addition, coolant is projected radially outwards towards the winding heads starting from the flow connection 51 and starting from the right mouth opening of the radially inner stator channels 53.

The two winding head spaces 27 are separated from one another in a substantially coolant-tight manner in the interior of the stator housing via the rotor/stator arrangement. In order to provide a flow connection between the two winding head spaces 27, there is a respective drain opening 54 on each of the two stator housing axial sides. These are positioned in the housing bottom of the stator housing 2. The coolant collecting on the bottom side in the respective winding head space 27 can flow out into an underlying stator housing sump 55 via the two drain openings 54. In the installed position, the stator housing sump 55 is positioned centrally, that is in vertical alignment with the rotor axis, at the lowest point below the stator housing 2, so that the coolant can flow under gravity from the inside of the stator housing into the stator housing sump 55.

In FIG. 1, the stator housing sump 55 extends approximately over the entire length of the stator housing in the axial direction. In addition, a transmission-side suction point A1 and a transmission-remote suction point A2 are provided on each of the two axial sides in the stator housing sump 55. At the transmission-side suction point A1, the coolant is extracted by a transmission return pump 59. At the suction point A2 remote from the transmission, the coolant is extracted by an electric machine return pump 56.

The transmission return pump 59 is part of a transmission hydraulic circuit G of the coolant supply system. In the transmission hydraulic circuit G, the coolant tank 35 is connected to the suction pump 37 via the suction line. By means of the suction pump 37, the coolant coming from the coolant tank 25 can be guided through a transmission supply line to a tooth engagement point Z of the transmission 19 in order to lubricate transmission components. From there, the coolant drips off and collects on the bottom of the transmission in a transmission sump 65. In the transmission sump 65, the coolant is guided back into the coolant tank 35 in a return line 67 using the transmission return pump 59.

In FIG. 1, the suction pump 37, the transmission return pump 59 and the electric machine return pump 56 are components of a multiple pump (combination pump). With such a multiple pump, the individual pumps are driven by a common drive shaft. The common drive shaft is in turn connected to an electric motor that acts as a drive.

As already mentioned, in FIG. 1 the electric machine is installed transversely parallel to the vehicle axle. Therefore, the transmission-side suction point A1 is positioned on the left side of the vehicle, while the transmission-remote suction point A2 is positioned on the right side of the vehicle. When the vehicle curves to the left, the coolant in the stator housing sump 55 is displaced towards the right suction point A2 due to centrifugal force. When the vehicle curves to the right, the coolant in the stator housing sump 55 is displaced towards the left suction point A1 due to centrifugal force. Therefore, when cornering, the coolant can be reliably returned to the coolant tank 35 either via the left suction point A1 or via the right suction point A2.

A core idea of the invention is that a flow connection 68 to the transmission sump 65 is formed on the side of the stator housing sump 55 close to the transmission. When cornering to the right, the coolant in the stator housing sump 55 is transferred via the flow connection 68 into the transmission sump 65. In this case, with double functionality, at the transmission-side suction point A1, not only the coolant collected in the transmission sump 65 is sucked off in the direction of the coolant tank 35, but the coolant is also transferred from the stator housing sump 55. A separate stator housing suction point A3 (as indicated in FIG. 3) can therefore be dispensed with on the side of the stator housing sump 55 close to the transmission.

As can be seen from FIG. 1, all pumps 37, 56, 59 are positioned on the left axial side of the stator housing 2 in a space-saving manner. The suction point A2 arranged on the stator housing axial side remote from the pump is connected to the electric machine return pump 56 via a return line 69. The return line 69 is positioned axially parallel to the stator housing sump 55 according to FIG. 2. The stator housing 2 can be realized as a cast part, on which both the stator housing sump 5 and the return line 69 are formed in one piece using the same material.

Figure 2:
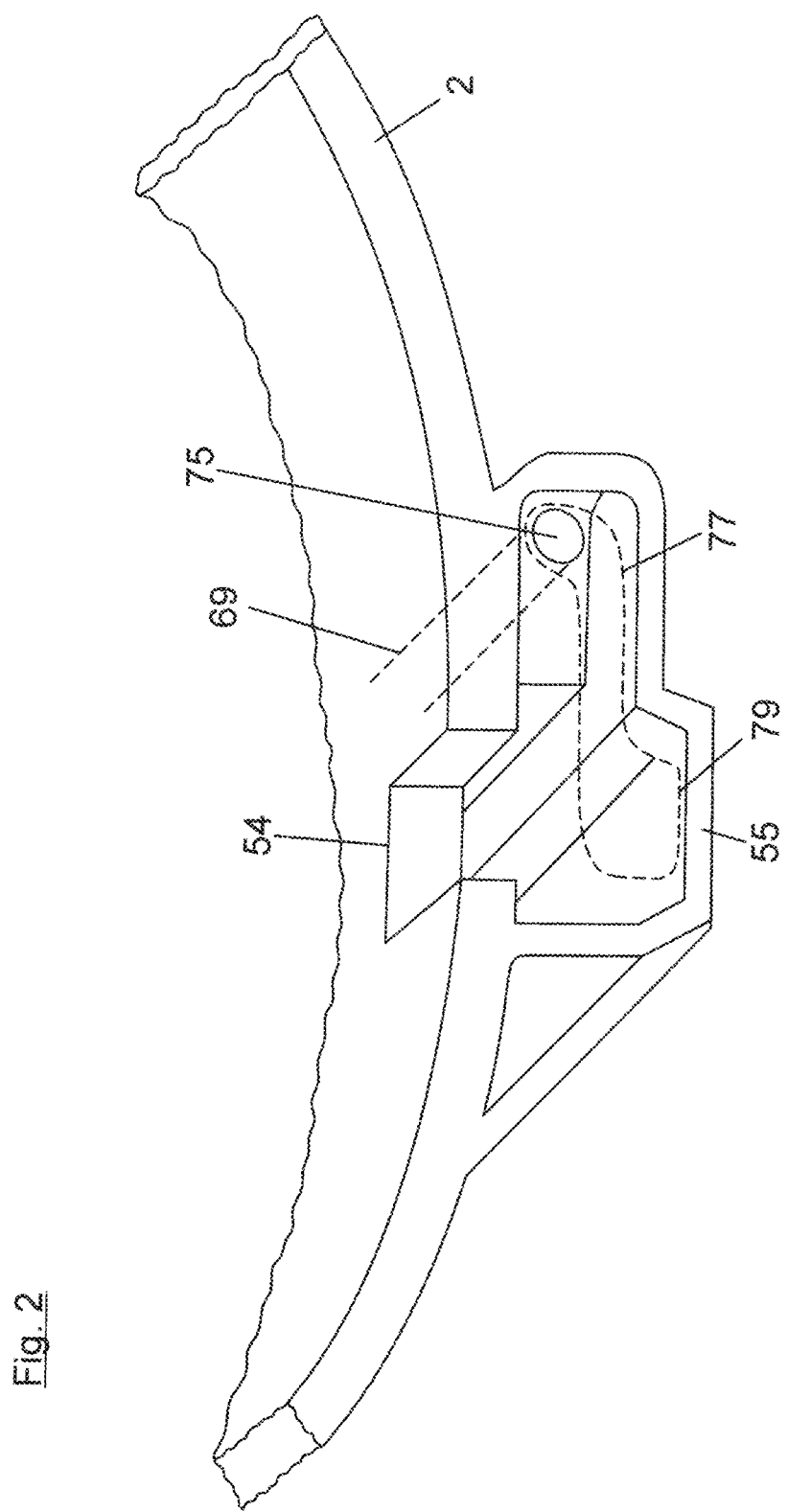
FIG. 2 shows a detailed view of one of the two suction points in the stator housing sump.

In FIG. 2, the return line 69 is also offset upwards by a height offset relative to the stator housing sump 55. In order to ensure an operationally reliable flow connection, the stator housing sump 55 and a mouth opening 75 of the return line 69 are connected via a suction nozzle 77 indicated by dashed lines. The suction nozzle 77 has a mouth opening 79, which lies in a horizontal plane and is immersed in the coolant.

Figure 3:
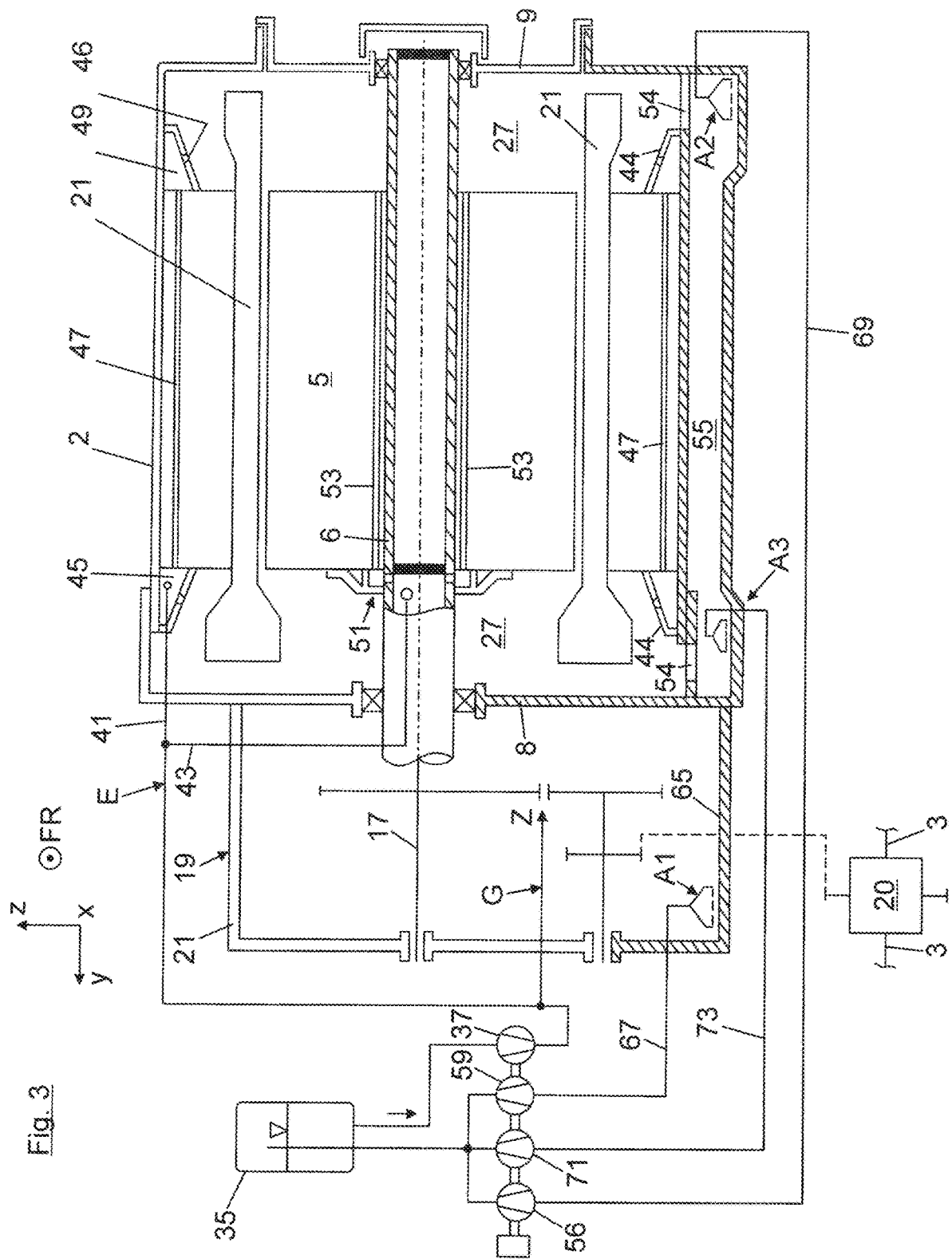
FIG. 3 shows a view corresponding to FIG. 1 of a second exemplary embodiment of the invention.

A second exemplary embodiment is shown in FIG. 3, which essentially has the same structure and the same functionality as the exemplary embodiment shown in FIG. 1. Therefore, reference is made to the previous description. In contrast to FIG. 1, in FIG. 3 there is no flow connection 68 between the stator housing sump 55 and the transmission sump 65. Instead, the left side of the stator housing sump 55 has its own suction point A3 on its side close to the transmission. This is connected via a return line 73 to a second electric machine return pump 71, which returns coolant from suction point A3 into the coolant tank 35.

Figure 4:
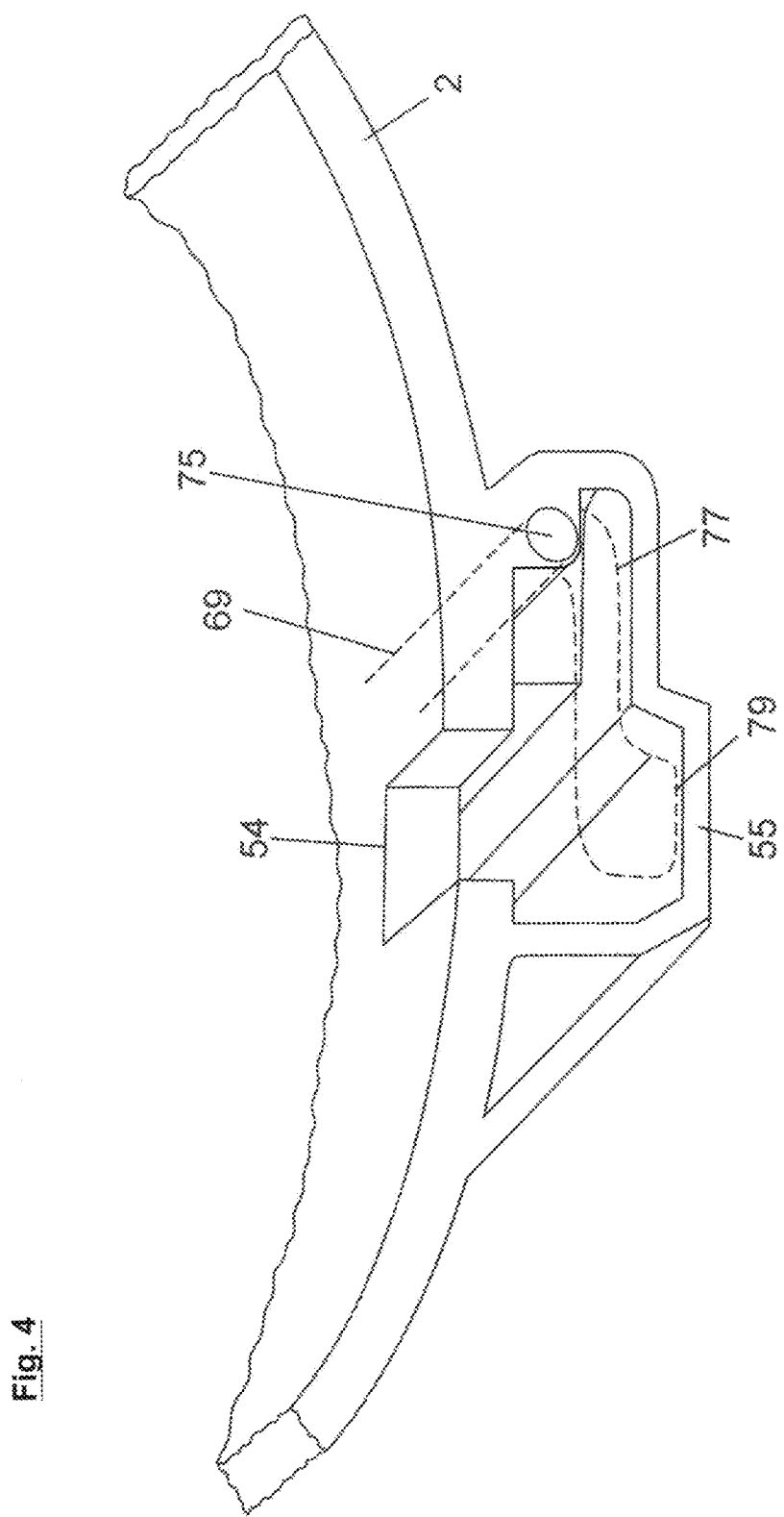
FIG. 4 shows a detailed view of one of the two suction points in the stator housing sump, with the embodiment of FIG. 4 specifically showing the return line as formed from the same piece as the stator-housing sump.

As noted, the stator housing 2 can be realized as a cast part, on which both the stator housing sump 5 and the return line 69 are formed in one piece using the same material. FIG. 4 depicts such an embodiment as a variation of the embodiment shown in FIG. 2.

LIST OF REFERENCE NUMERALS 2 stator housing
3 flange shafts
4 stator
5 rotor
6 rotor shaft
8,9 housing walls
17 transmission input shaft
19 transmission
21 stator windings
27 winding head space
35 coolant tank
37 suction pump
41, 43 coolant supply lines
44 coolant spray rings
45 annular gap
46 nozzles
47 radially outer stator channels
49 annular gap
51 flow connection
53 radially inner stator channels
54 drain openings
55 stator housing sump
56 electric machine return pump
59 transmission return pump
65 transmission sump
67 return line
68 flow connection
69 return line
71 second electric machine return pump
73 return line
75 mouth opening
77 suction nozzle
A1 left suction point
A2 right suction point
A3 additional suction point
G transmission hydraulic circuit
E electric machine hydraulic circuit
Z tooth meshing point

The invention claimed is:

1. A coolant supply system for a drive device of an electrically operated vehicle axle of a two-track vehicle with an electric machine, comprising: an electric machine hydraulic circuit in which the interior of a cylindrical stator housing and a stator housing sump are integrated, in which the coolant draining from the stator housing collects, which is returned from there to a coolant tank by a plurality of return pumps, wherein the stator housing sump at each of its axially opposite axial sides has a suction point at which the coolant is sucked off, wherein the coolant is sucked off by action of a first return pump in the plurality of return pumps on a first side and by action of a second return pump in the plurality of return pumps on an opposite side, wherein an output of the plurality of return pumps is combined prior to flow of the coolant into the coolant tank, and a drain opening is formed on each stator housing axial side on the stator housing bottom, via which the coolant is drained from a respective winding head space into the stator housing sump.

2. The coolant supply system according to claim 1, wherein the electric machine is installed transversely parallel to the vehicle axis, and a first suction point of the stator housing sump is positioned on the left side of the vehicle and the second suction point of the stator housing sump is positioned on the right side of the vehicle, and, when the vehicle is cornering to the left, the coolant in the stator housing sump shifts towards the right suction point due to centrifugal force, and when the vehicle is cornering to the right, the coolant in the stator housing sump shifts towards the left suction point due to centrifugal force, so that the coolant is safely returned to the coolant tank from either the first or second suction point when cornering.

3. The coolant supply system according to claim 1, wherein, in the drive device, the electric machine drives via a gear flange shafts guided to the vehicle wheels, and the coolant supply system has a transmission hydraulic circuit, in which a transmission chamber and a transmission sump formed on the transmission bottom are integrated, in which the coolant draining from transmission components collects at a transmission-side suction point, from which the coolant is returned into the coolant tank with a transmission return pump provided in the plurality of return pumps, and the transmission is arranged on a stator housing axial side.

4. The coolant supply system according to claim 3, wherein a flow connection is formed between the stator housing sump and the transmission sump, and the coolant collected in the stator housing sump, as a result of cornering, is transferred to the transmission sump at the flow connection, so that the transmission-side suction point has a dual function, namely not only collecting the coolant that collects in the transmission sump, but also sucking the coolant transferred from the stator housing sump to the coolant tank.

5. The coolant supply system according to claim 1, wherein no flow connection is formed between the stator housing sump and the transmission sump, and, on the side of the stator housing sump close to the transmission, a separate stator housing suction point is provided, and the stator housing suction point is assigned an electric machine return pump provided in the plurality of return pumps, which transfers the coolant from the stator housing suction point towards the coolant tank.

6. The coolant supply system according to claim 1, wherein the plurality of return pumps are arranged on a common stator housing axial side and the stator housing sump extends in the axial direction up to the respective stator housing axial sides.

7. The coolant supply system according to claim 6, wherein the suction point arranged on the axial side of the stator housing remote from the first return pump is connected to the electric machine return pump via a return line.

8. The coolant supply system according to claim 7, wherein the return line runs axially parallel to the stator housing sump, and the return line is formed of the same material and in one piece on the stator housing.

9. The coolant supply system according to claim 2, wherein, in the drive device, the electric machine drives via a gear flange shafts guided to the vehicle wheels, and the coolant supply system has a transmission hydraulic circuit, in which a transmission chamber and a transmission sump formed on the transmission bottom are integrated, in which the coolant draining from transmission components collects at a transmission-side suction point, from which the coolant is returned into the coolant tank with a transmission return pump provided in the plurality of return pumps and the transmission is arranged on a stator housing axial side.

10. The coolant supply system according to claim 2, wherein no flow connection is formed between the stator housing sump and the transmission sump, and, on the side of the stator housing sump close to the transmission, a separate stator housing suction point is provided, and the stator housing suction point is assigned an electric machine return pump provided in the plurality of return pumps, which transfers the coolant from the stator housing suction point towards the coolant tank.

11. The coolant supply system according to claim 3, wherein no flow connection is formed between the stator housing sump and the transmission sump, and, on the side of the stator housing sump close to the transmission, a separate stator housing suction point is provided, and the stator housing suction point is assigned an electric machine return pump provided in the plurality of return pumps, which transfers the coolant from the stator housing suction point towards the coolant tank.

12. The coolant supply system according to claim 2, wherein the plurality of return pumps are arranged on a common stator housing axial side and the stator housing sump extends in the axial direction up to the respective stator housing axial sides.

13. The coolant supply system according to claim 3, wherein the plurality of return pumps are arranged on a common stator housing axial side and the stator housing sump extends in the axial direction up to the respective stator housing axial sides.

14. The coolant supply system according to claim 4, wherein the plurality of return pumps are arranged on a common stator housing axial side and the stator housing sump extends in the axial direction up to the respective stator housing axial sides.

15. The coolant supply system according to claim 5, wherein the plurality of return pumps are arranged on a common stator housing axial side and the stator housing sump extends in the axial direction up to the respective stator housing axial sides.

* * * * *